Jan. 6, 1953          R. E. MEAGHER          2,624,871

SENSITIVITY CONTROL CIRCUIT FOR RADAR RECEIVERS

Filed Sept. 14, 1945

INVENTOR.

RALPH E. MEAGHER

BY

*William D. Hall.*

ATTORNEY.

Patented Jan. 6, 1953

2,624,871

UNITED STATES PATENT OFFICE 2,624,871

SENSITIVITY CONTROL CIRCUIT FOR RADAR RECEIVERS

Ralph E. Meagher, Watertown, Mass., assignor, by mesne assignments, to the United States of America as represented by the Secretary of War Application September 14, 1945, Serial No. 616,373

7 Claims. (Cl. 343—5)

The present invention relates generally to electrical circuits and more particularly to a method for the remote control of a periodic sensitivity variation in a receiver for electromagnetic pulses.

In certain types of radio object locating systems pulses of electromagnetic energy are transmitted by a directive antenna and echo pulses from reflecting objects are used to determine the position of selected objects in range, elevation, and azimuth. The strength of an echo pulse from a given object has been found to vary inversely as the fourth power of the range of the object from the locating system. To compensate to some extent for this rapid change of signal strength with range, it is sometimes convenient to cause a periodic variation of receiver sensitivity in such a manner that at the time echoes are received from nearby targets the sensitivity is low, and as echoes are received from targets at increasing ranges the sensitivity increases. This method of varying the sensitivity of the receiver is known as sensitivity time control (STC).

One method of STC makes use of a periodic voltage waveform which is applied to the receiver, for example, as a bias on the grid of a variable-$\mu$ amplifier tube, to cause the desired variation of sensitivity. The R.-F. components of the receiver and transmitter are usually located near the antenna of the system while the controlling apparatus is generally, for convenience, located at some distance from the antenna. Consequently the application of STC voltage to one or more R.-F. stages of the receiver requires some sort of remote control if the shape of the STC waveform is to be varied. One method of variation involves the generation of an STC voltage wave at a point near the controlling apparatus where the waveform may be conveniently varied. There is thus required the transmission of this waveform over an appreciable length of cable to the R.-F. stages, which generally involves sufficient delay and distortion to make the use of this method inconvenient.

It is therefore an object of this invention to provide a method of STC which includes a convenient means of varying the shape and the amplitude of the STC voltage waveform. It is a further object of this invention to provide an STC voltage generator circuit the output waveform of which may be controlled by variation of D.-C. voltages. It is another object to provide a method of STC in which the generation of the STC waveform may be controlled from a remote point.

Other objects, features, and advantages of this invention will suggest themselves to those skilled in the art and will become apparent from the following description of the invention taken in connection with the accompanying drawing in which.

Figure 1:
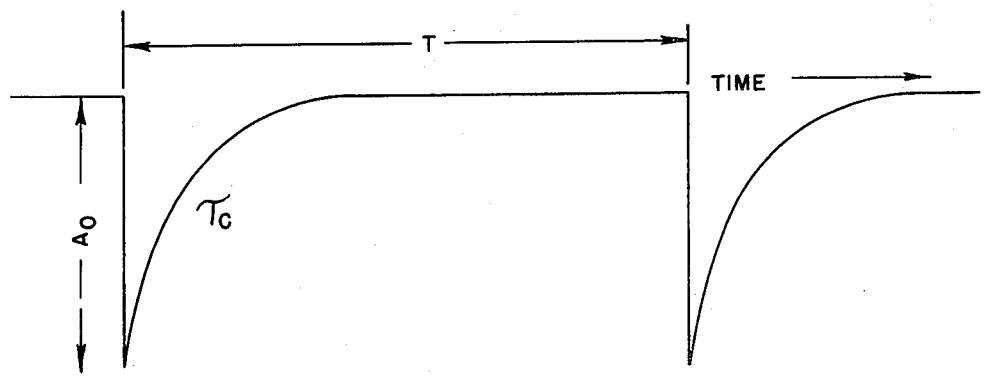
Fig. 1 shows a typical STC voltage waveform.

Reference is now made more particularly to Fig. 1, showing two cycles of a typical STC voltage waveform. The repetition period T of this waveform is the same as that of the transmitted pulse of the locating system. If this waveform is applied to the control grid of one or more amplifier stages employing variable -$\mu$ vacuum tubes, the gain of the receiver will vary directly with the periodic STC voltage variations. The amount of overall gain variation will be determined within limits by the amplitude of the voltage wave shown as $A_0$ in Fig. 1, while the rate of change of gain during the period of increase is determined by the time constant of the voltage rise.

Figure 2:
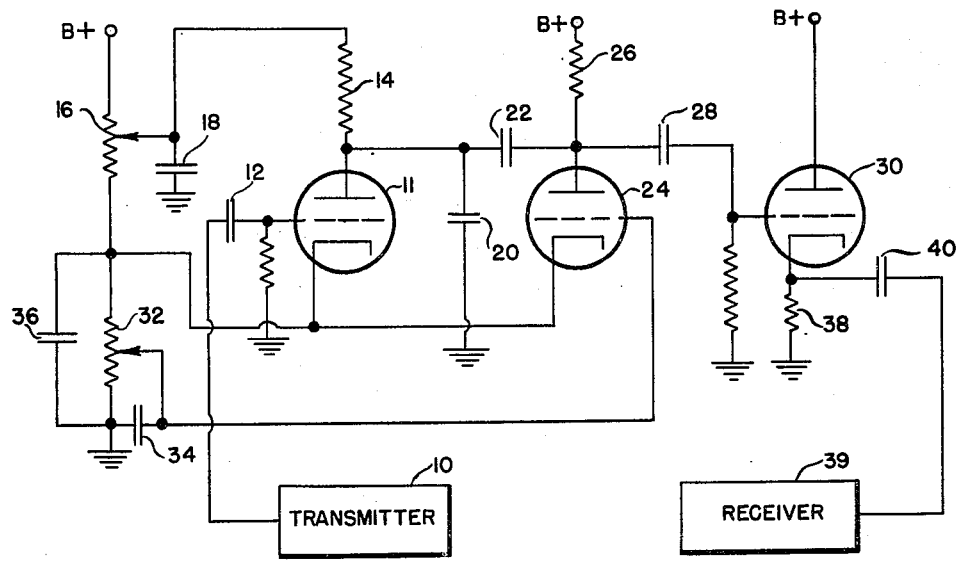
Fig. 2 is a diagram of a circuit involving the principles of the present invention.

The circuit of Fig. 2 is an example of a circuit capable of generating a waveform such as shown in Fig. 1. A trigger pulse from the transmitter 10 of the system is applied to the grid of triode 11 through capacitor 12 each time a pulse is transmitted. An adjustable voltage is applied through resistor 14 to the plate of triode 11 from the variable tap of potentiometer 16, which is also bypassed to ground by capacitor 18. Capacitor 20 is connected between the plate of triode 11 and ground, while capacitor 22, of a large value compared to capacitor 20, is connected between the plates of triodes 11 and 24. The plate of triode 24 is also connected through resistor 26 to a source of positive potential and through capacitor 28 to the grid of cathode follower triode 30.

The grid of triode 24 is biased from the adjustable tap of potentiometer 32, which is bypassed to ground through capacitor 34, the entire potentiometer being bypassed by capacitor 36. Potentiometers 16 and 32 with their associated bypass capacitors are connected in series between a source of positive potential and ground and may be located in a separate unit near the control panel and their D.-C. output voltage transmitted by cable to the remainder of the circuit. The cathodes of triodes 11 and 24 are both connected to the junction between potentiometers 16 and 32. The plate of cathode follower triode 30 is connected directly to a source of positive potential. The output voltage developed across the cathode load resistor 38 is applied to the receiver 39 of the system through coupling capacitor 40.

When the circuit of Fig. 2 is in operation, triode 11 is normally non-conducting due to the positive potential on its cathode. This causes capacitor 20 to be charged normally to nearly the full voltage applied from potentiometer 16. When a trigger pulse from the transmitter causes triode 11 to be highly conductive, the potential on its plate falls nearly to that of its cathode, allowing capacitor 20 to discharge rapidly. After the termination of the trigger pulse, capacitor 20 again starts charging exponentially. The time constant of charge is given to a good approximation by $t_c = RC_1$, in which $$R = \frac{1}{\frac{1}{R_1} + \frac{1}{R_2} + \frac{1}{r_p}}$$

$R_1$, $R_2$, and $r_p$ being the values of resistors 14 and 26 and the plate resistance of triode 24 respectively. $C_1$ is the capacitance of capacitor 20.

Capacitor 22 is large in comparison to capacitor 20 and serves merely to isolate the plates of triodes 11 and 24 for D.-C. By adjusting the position of the movable tap of potentiometer 22 and thereby changing the bias on the grid of triode 24, the value of $r_p$ is changed, as is also that of $t_c$. By adjusting the position of the movable tap of potentiometer 16 and thereby changing the voltage to which capacitor 20 is charged, the magnitude of the initial drop of voltage $A_0$ is changed. The resulting variation is transmitted through cathode follower 30 to the receiver 39.

It will be obvious to those skilled in the art that other methods may be used to vary the values of $t_c$ and $A_0$. For example, changing the value of the quiescent potential on any of the electrodes of triode 11 will serve to vary the amplitude of $A_0$. Similarly changing the potentials applied to any of the electrodes of triode 24 will vary the $r_p$ of this tube and hence will vary the time constant $t_c$.

While there has been described what is at present considered to be the preferred embodiment of this invention, it will be obvious to those skilled in the art that various changes and modifications may be made therein without departing from the scope of the invention as set forth in the appended claims.

The invention claimed is:

1. In combination, a first means for transmitting pulses of electromagnetic energy, a second means for receiving echo pulses of electromagnetic energy from reflecting objects, and a circuit for periodically varying the sensitivity of said second means, said circuit including a storage capacitor, potentiometer means for applying an adjustable direct current voltage to charge said capacitor, a first vacuum tube connected substantially in parallel with said capacitor, means for applying a periodic trigger pulse from said first means to the control grid of said first vacuum tube so as to render it conducting and to discharge said capacitor, charge control means including a second vacuum tube for varying the rate of charge of said capacitor, potentiometer means for adjusting the direct current bias on the control grid of said second vacuum tube, and means including a cathode follower for transmitting to said second means the voltage variations occurring across said capacitor.

2. In a radiant energy receiver having discretely spaced operating periods, a circuit for varying the sensitivity of said receiver during each of said operating periods, comprising a normally open electronic switch adapted to be closed by one of a series of trigger pulses each of which is respectively substantially coincident with the beginning of each of said operating periods, an electrical energy storage means connected across said switch, means for continually charging said electrical energy storage means, said switch upon being closed by one of said trigger pulses effecting a discharge of said storage means, a vacuum tube in shunt with the charge path of said storage means for controlling its rate of charge, and signal translating means for coupling the control voltage output of said storage means to said receiver to control the gain thereof.

3. A circuit according to claim 2 wherein said electronic switch comprises an electron discharge device normally biased below cut-off, and said translating means comprises a vacuum tube connected as a cathode follower.

4. A circuit according to claim 2 wherein said vacuum tube comprises a triode, and further including a remotely located potentiometer connected between a source of direct current and ground, said potentiometer having a connection to the control grid of said triode for varying its bias, thereby varying the impedance of said triode and the charging rate of said storage means.

5. In a radiant energy receiver having discretely spaced operating periods, a circuit for varying the sensitivity of said receiver during each of said operating periods, comprising a storage capacitor, a source of direct current connected for charging said capacitor, a first vacuum tube normally biased below cut-off and adapted to be caused to conduct by one of a series of trigger pulses respectively occurring at a time substantially coincident with the beginning of each of said operating periods, said first tube being connected to said storage capacitor for effecting a discharge thereof upon conduction, said vacuum tube having a plate connected to a source of adjustable potential and a cathode connected to a source of fixed potential, a variable impedance circuit including a triode second vacuum tube connected in series with the charging path of said storage capacitor for controlling the rate of charge thereof, said second vacuum tube having its control grid connected to a source of adjustable potential, and a third vacuum tube having its input connected across said storage capacitor and connecting said capacitor to said receiver for controlling the gain of said receiver, said third vacuum tube being connected as a cathode follower.

6. A circuit for varying the sensitivity of a receiver of radiant energy, comprising an electrical energy storage device, a means connected across said device for continuously applying charging electrical energy thereto, an electronic switch means for controlling a discharge circuit for said device and in shunt therewith, said switch means being responsive to each of a series of trigger pulses connected to control said switch, a vacuum tube, the impedance of which is adapted to be varied, connected in shunt with the charge path of said storage device for controlling the rate of charging thereof; and means for connecting the output of said storage device as a sensitivity control for said receiver.

7. A circuit according to claim 6 wherein there is connected to said means for continually applying electrical energy a means for adjusting the voltage output thereof.

RALPH E. MEAGHER.

(References on following page)

REFERENCES CITED

The following references are of record in the file of this patent:

UNITED STATES PATENTS

| Number | Name | Date |
|---|---|---|
| 2,055,883 | Terry | Sept. 29, 1936 |
| 2,227,598 | Lyman | Jan. 7, 1941 |
| 2,275,460 | Page | Mar. 10, 1942 |
| 2,373,145 | Sensiper | Apr. 10, 1945 |
| 2,404,160 | Boucke | July 16, 1946 |
| 2,427,523 | Dolberg et al. | Sept. 16, 1947 |
| 2,428,038 | Rothbart | Sept. 30, 1947 |
| 2,448,069 | Ames, Jr., et al. | Aug. 31, 1948 |
| 2,451,632 | Oliver | Oct. 19, 1948 |
| 2,464,393 | Heim | Mar. 15, 1949 |
| 2,498,381 | Smith | Feb. 21, 1950 |